US010007359B2

(12) United States Patent
Chung et al.

(10) Patent No.: US 10,007,359 B2
(45) Date of Patent: Jun. 26, 2018

(54) NAVIGATION TRACE CALIBRATING METHOD AND RELATED OPTICAL NAVIGATION DEVICE

(71) Applicant: PixArt Imaging Inc., Hsin-Chu (TW)

(72) Inventors: Ching-Lin Chung, Hsin-Chu (TW); Chia-Fu Ke, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 151 days.

(21) Appl. No.: 15/007,218

(22) Filed: Jan. 27, 2016

(65) Prior Publication Data

US 2017/0102790 A1 Apr. 13, 2017

(30) Foreign Application Priority Data

Oct. 7, 2015 (TW) ............................. 104132932 A

(51) Int. Cl.

*G06F 3/038* (2013.01)
*G06F 3/03* (2006.01)
*G06F 3/0354* (2013.01)

(52) U.S. Cl.

CPC ........ *G06F 3/03542* (2013.01); *G06F 3/0383* (2013.01); *G06F 3/03545* (2013.01)

(58) Field of Classification Search

CPC ... G06F 3/0352; G06F 3/0383; G06F 3/03545
See application file for complete search history.

(56) References Cited

U.S. PATENT DOCUMENTS

2010/0302152 A1* 12/2010 Kirigaya ............. G06F 3/03542 345/158
2013/0278550 A1* 10/2013 Westhues ........... G06F 3/03545 345/174
2015/0084853 A1* 3/2015 Li ......................... G06F 3/0304 345/156

* cited by examiner

*Primary Examiner* — Ariel Balaoing
(74) *Attorney, Agent, or Firm* — Winston Hsu

(57) ABSTRACT

A navigation trace calibrating method and a related optical navigation device are utilized to transform a first trace line generated by the optical navigation device into a second trace line suitable for user operation. The navigation trace calibrating method includes establishing a reference coordinate system, reading and analyzing the first trace line, calculating a first offset of the first trace line relative to the reference coordinate system, defining an offset between the first trace line and the second trace line as calibration weight to acquire a second offset of the second trace line relative to the reference coordinate system, and calculating a value of the calibration weight according to the second offset and a length of the first trace line.

19 Claims, 6 Drawing Sheets

Establish the reference coordinate system — 300
Read and analyze the first trace line — 302
Calculate the first offset of the first trace line relative to the reference coordinate system — 304
Define the offset between the first trace line and the second trace line as the calibration weight to acquire the second offset — 306
Calculate the calibration weight according to the second offset and the length of the first trace line — 308
Transform the first trace line into the second trace line by the calibration weight, and set the second trace line as the navigation trace of the optical navigation device — 310

NAVIGATION TRACE CALIBRATING METHOD AND RELATED OPTICAL NAVIGATION DEVICE

BACKGROUND OF THE INVENTION

1. Field of the Invention

The present invention relates to an optical navigation device, and more particularly, to a navigation trace calibrating method and an optical navigation device capable of executing the navigation trace calibrating method.

2. Description of the Prior Art

Please refer to FIG. 6. FIG. 6 is an operation diagram of an optical pen mouse 60 in the prior art. The pen head of the optical pen mouse 60 has an optical navigation chip (not shown in the figure), the optical navigation chip reads a moving trace of the pen head on a reference plane, transmits the moving trace to an external electronic device and the moving trace can be displayed on a screen 62. Generally, the optical navigation chip is disposed inside the pen head of the optical pen mouse 60 of normal and acceptable look; as shown in FIG. 6, while the optical pen mouse 60 is handled for writing characters or drawing patterns, the pen tube of the optical pen mouse 60 is inclined relative to the planar normal vector V of the reference plane to form an angle φ, and the optical navigation chip is slightly deviated from the reference plane because of the angle φ. As a horizontal line is drawn on the reference plane by the optical pen mouse 60, a line displayed on the screen 62 by the optical navigation chip after analyzing the moving trace of the optical pen mouse 60 is oblique than the horizontal line as the angle φ.

For solving the above-mentioned mistake, the conventional optical pen mouse 60 disposes the optical navigation chip obliquely inside the pen head (the oblique angle may be equal to the angle φ) to overcome the foresaid mistake of the drawing line being inconsistent with the displaying line on the digital image, however the angle φ generated by handling the optical pen mouse 60 is varied according to a palm size, a posture habit and a writing environment of the user, handwriting deviation (such like inconsistency of the drawing line and the displaying line on the digital image) cannot be effectively overcome by conventional hardware calibration of disposing the optical navigation chip obliquely inside the pen mouse.

SUMMARY OF THE INVENTION

The present invention provides a navigation trace calibrating method and an optical navigation device capable of executing the navigation trace calibrating method for solving above drawbacks.

According to the claimed invention, a navigation trace calibrating method is adapted to transform a first trace line generated by an optical navigation device into a second trace line suitable for user operation. The navigation trace calibrating method includes steps of establishing a reference coordinate system, reading and analyzing the first trace line, calculating a first offset of the first trace line relative to the reference coordinate system, defining an offset between the first trace line and the second trace line as calibration weight to acquire a second offset of the second trace line relative to the reference coordinate system, and calculating a value of the calibration weight according to the second offset and a length of the first trace line.

According to the claimed invention, an optical navigation device with navigation trace calibrating function is capable of transforming a first trace line generated by the optical navigation device into a second trace line suitable for user operation. The optical navigation device includes a navigation chip and a control unit. The navigation chip is adapted to generate the foresaid trace line. The control unit is electrically connected to the navigation chip and adapted to acquire information of the foresaid trace line. The control unit utilizes the navigation chip to establish a reference coordinate system, analyzes the first trace line and calculates a first offset of the first trace line relative to the reference coordinate system, defines calibration weight between the first trace line and the second trace line to acquire a second offset of the second trace line relative to the reference coordinate system, and calculates a value of the calibration weight according to the second offset and a length of the first trace line.

The navigation trace calibrating method and the related optical navigation device of the present invention can calculate the proper calibration weight of the navigation trace according to a body size and a posture of the user, handwriting posture (applied to the optical navigation device) is no need of adjustment, and the optical navigation device can accordingly calibrate the navigation trace drew by the user with different habit. The user executes the navigation trace calibrating method in first use of the optical navigation device, to acquire the personal value of the calibration weight, and the personal value can be stored in a memory unit of the optical navigation device for next application; or the optical navigation device may immediately acquire the current value of the calibration weight while the optical navigation device is operated, which depends on user's demand. After the calibration weight is calculated by the navigation trace calibrating method, the optical navigation device can automatically execute the navigation trace calibration, or adjust the navigation trace according to the calibration angle chosen by the user, or execute the navigation trace calibration according to pre-setting application program of the optical navigation device. The optical navigation device of the present invention has an advantage of adaptive calibrating function applied to the navigation trace for providing preferred market competition.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
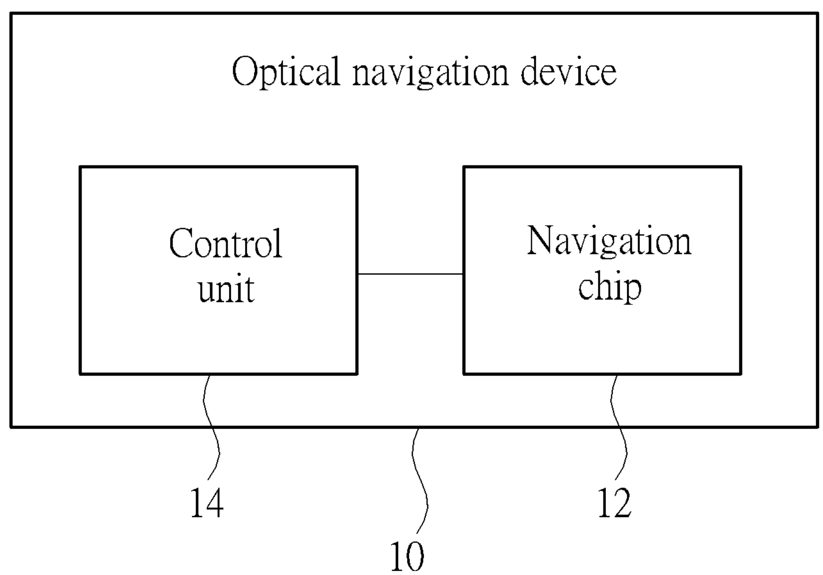
FIG. 1 is a functional block diagram of an optical navigation device according to an embodiment of the present invention.
Figure 2:
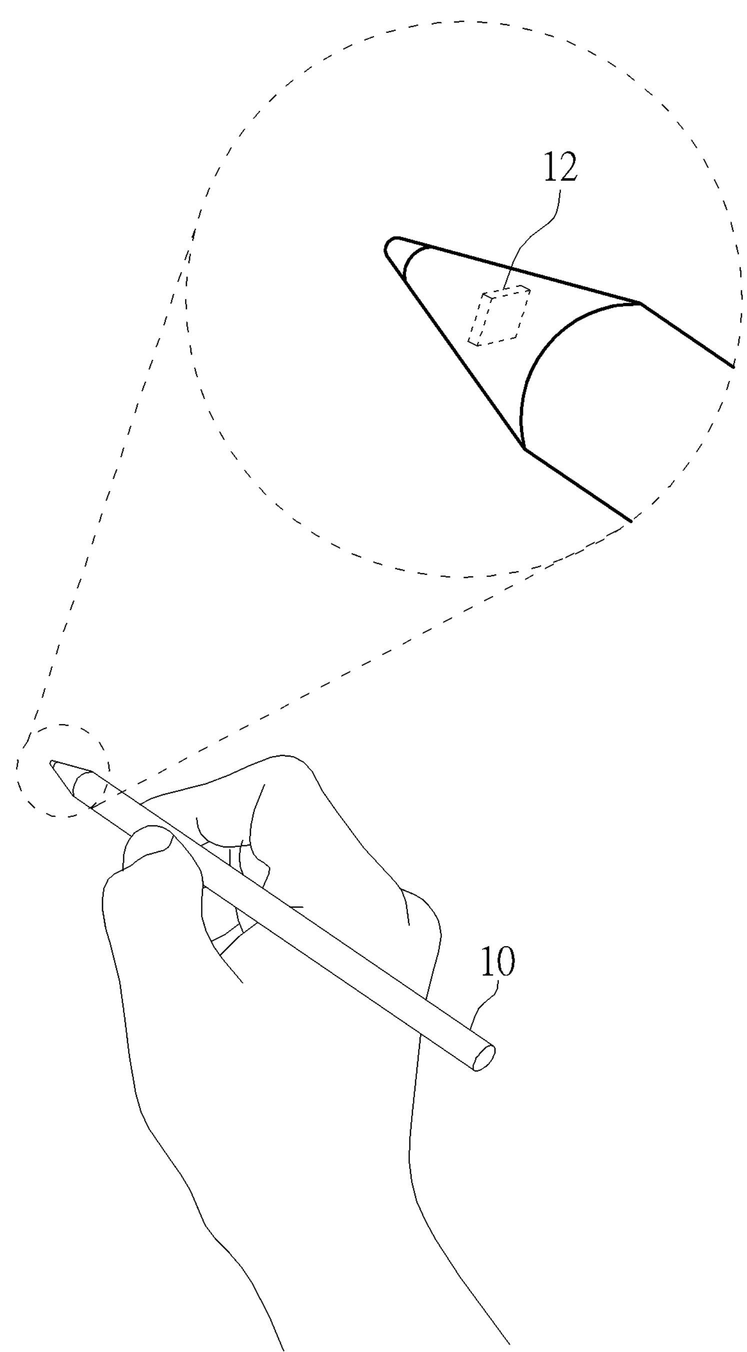
FIG. 2 is an operation diagram of the optical navigation device according to the embodiment of the present invention.

Please refer to FIG. 1 and FIG. 2. FIG. 1 is a functional block diagram of an optical navigation device 10 according to an embodiment of the present invention. FIG. 2 is an operation diagram of the optical navigation device 10 according to the embodiment of the present invention. The optical navigation device 10 utilizes navigation trace calibration to transform a first trace line drew by the user into a second trace line suitable for user's operation angle. The optical navigation device 10 can be a pen mouse, which mainly includes a navigation chip 12 and a control unit 14 electrically connected with each other. As shown in FIG. 2, a pen tube of the optical navigation device 10 (which is represented as the pen mouse) is inclined while the pen mouse is handled in operation. The navigation chip 12 generates the first trace line by moving the pen mouse above a reference plane, and the first trace line displayed on a displaying screen is deviated from a real motion track of the optical navigation device 10 due to inclination of the pen tube. Therefore, the control unit 14 executes a navigation trace calibrating method to transform the first trace line into the second trace line suitable for the user's operation angle, and the optical navigation device 10 outputs the calibrated navigation trace for identifying a control command input by the user.

In the present invention, assembly of the navigation chip 12 and the control unit 14 can be varied according to design demand. For example, the control unit 14 may be integrated with the navigation chip 12, which means operation of the navigation trace calibrating method is accomplished by the navigation chip 12; or, the control unit 14 can be a control chip independent of the navigation chip 12, the control chip is a micro controller of the optical navigation device adapted to execute the operation of the navigation trace calibrating method; further, the control unit 14 can be an operating processor independent of the navigation chip 12 or an auxiliary application program of the computer system.

Figure 3:
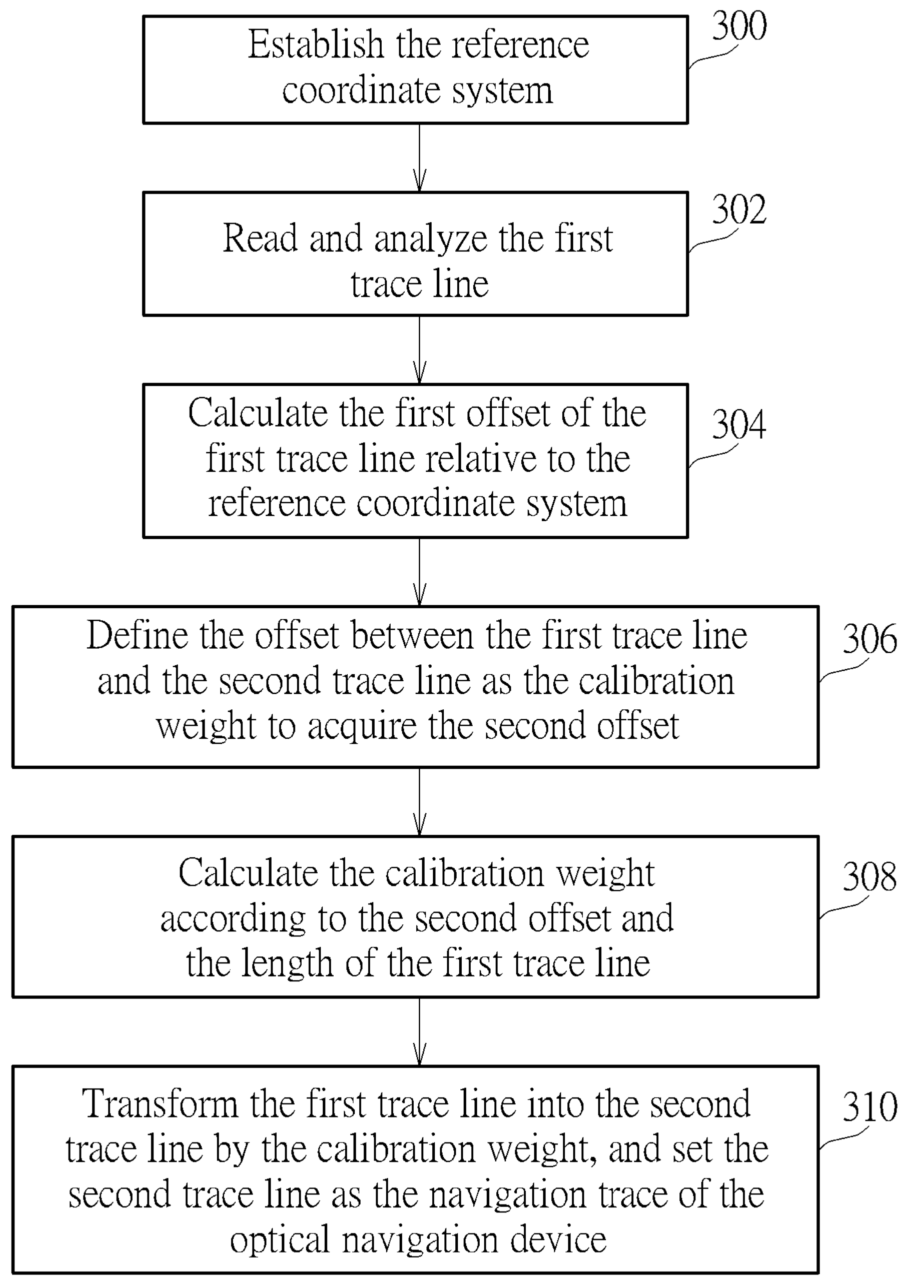
FIG. 3 is a flow chart of a navigation trace calibrating method according to the embodiment of the present invention.
Figure 4:
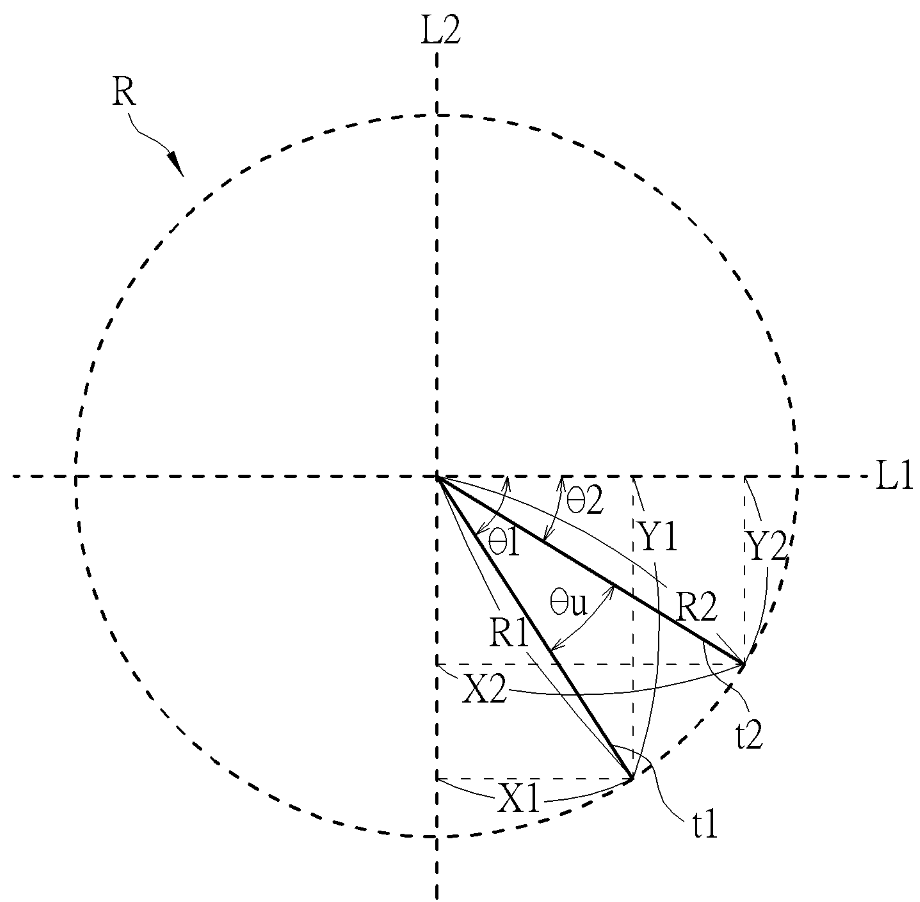
FIG. 4 is a diagram of a calibration circle applied to the navigation trace according to the embodiment of the present invention.

Please refer to FIG. 3 and FIG. 4. FIG. 3 is a flow chart of the navigation trace calibrating method according to the embodiment of the present invention. FIG. 4 is a diagram of a calibration circle applied to the navigation trace according to the embodiment of the present invention. The navigation trace calibrating method illustrated in FIG. 3 is suitable for the optical navigation device 10 shown in FIG. 1 and FIG. 2. First, step 300 is executed to utilize the optical navigation device 10 to establish a suppositional reference coordinate system upon the reference plane. The reference coordinate system can be indicated by the rectangular coordinates (such like Cartesian coordinates) or the polar coordinates, which depends on design demand. As shown in FIG. 4, the reference coordinate system is, but not limited to, the rectangular coordinates formed by a horizontal reference axis L1 and a vertical horizontal reference axis L2, and the horizontal reference axis L1 and the vertical horizontal reference axis L2 are manually drew on the reference plane by the user. As the optical navigation device 10 moves over the reference plane, the first trace line t1 (which means an initial trace line) is generated by the navigation chip 12, orientation of the first trace line t1 is deviated from a moving direction of the optical navigation device 10 (for example, an angle θu is formed between the first trace line t1 and the second trace line t2, as shown in FIG. 4), and the control unit 14 executes the navigation trace calibration accordingly.

In step 302, the control unit 14 reads and analyzes the first trace line t1, and establishes the calibration circle R with a radius equal to the first trace line t1 on the reference coordinate system. Then, step 304 is executed to calculate a first offset θ1 of the first trace line t1 relative to the reference axes of the reference coordinate system. For example, a length R1 of the first trace line t1 is known and equal to the radius of the calibration circle R, the control unit 14 acquires a projection length X1 of the length R1 upon the horizontal reference axis L1 and a projection length Y1 of the length R1 upon the vertical reference axis L2, so that the length R1 and the projection length X1 or the projection length Y1 can be utilized to calculate the first offset θ1 by formulas 1-3.

$$R1=\sqrt{X1^2+Y1^2} \quad \text{(Formula 1)}$$

$$\theta1=\sin^{-1}(Y1/R1) \quad \text{(Formula 2)}$$

$$\theta1=\cos^{-1}(X1/R1) \quad \text{(Formula 3)}$$

Then, step 306 is executed to assume that the first trace line t1 can be transformed into the second trace line t2 by calibration, so as to define an offset between the first trace line t1 and the second trace line t2 as the unknown calibration weight θu, and to acquire the second offset θ2 of the second trace line t2 relative to the horizontal reference axis L1 of the reference coordinate system. It is to say, difference between the first offset θ1 and the calibration weight θu is equal to the second offset θ2.

Step 308 is executed to calculate a value of the calibration weight θu according to the second offset θ2 and the length R1 of the first trace line t1. The length R2 of the second trace line t2 is equal to the length R1, the control unit 14 defines the projection length X2 of the second trace line t2 relative to the horizontal reference axis L1 of the reference coordinate system and the projection length Y2 of the second trace line t2 relative to the vertical reference axis L2 of the reference coordinate system by the second offset θ2, and further utilizes the projection lengths X2, Y2, the length R1 of the first trace line t1, the length R2 of the second trace line t2, and the triangle side length formula to calculate the calibration weight θu, as described in formulas 4-6. While the actual value of the calibration weight θu is acquired, step 310 is executed to transform coordinates of each pixel on the first trace line t1 by the calibration weight θu, so as to obtain coordinates of each corresponding pixel on the second trace line t2, and the control unit 14 sets the second trace line t2 as the real/final navigation trace of the optical navigation device 10.

$$R2=R1=\sqrt{X2^2+Y2^2} \quad \text{(Formula 4)}$$

$$X2=R1\times\cos\,\theta2=R1\times\cos(\theta1-\theta u) \quad \text{(Formula 5)}$$

$$Y2=R1\times\sin\,\theta2=R1\times\sin(\theta1-\theta u) \quad \text{(Formula 6)}$$

It should be mentioned that during calibration of the first trace line t1 and the second trace line t2, edges of the trace lines may irregular, such like having serrate shape, due to relativity of digital signal transformation, so that the control unit 14 can optionally use the common linear smooth function to enhance the edges of the transformed trace lines, to make handwriting of the optical navigation device 10 (such as the pen mouse) be artistic.

Moreover, relation between the calibration weight θu, the first offset θ1 and the second offset θ2 is mentioned as above, the difference between the first offset θ1 and the calibration weight θu is equal to the second offset θ2, any unknown value can be calculated while two of the calibration weight θu, the first offset θ1 and the second offset θ2 are acquired. In the above-mentioned embodiment, the calibration weight θu is the unknown value, being calculated by the known first offset θ1 and the known second offset θ2; however, the first offset θ1 or the second offset θ2 further can be the unknown value accordingly.

Figure 5:
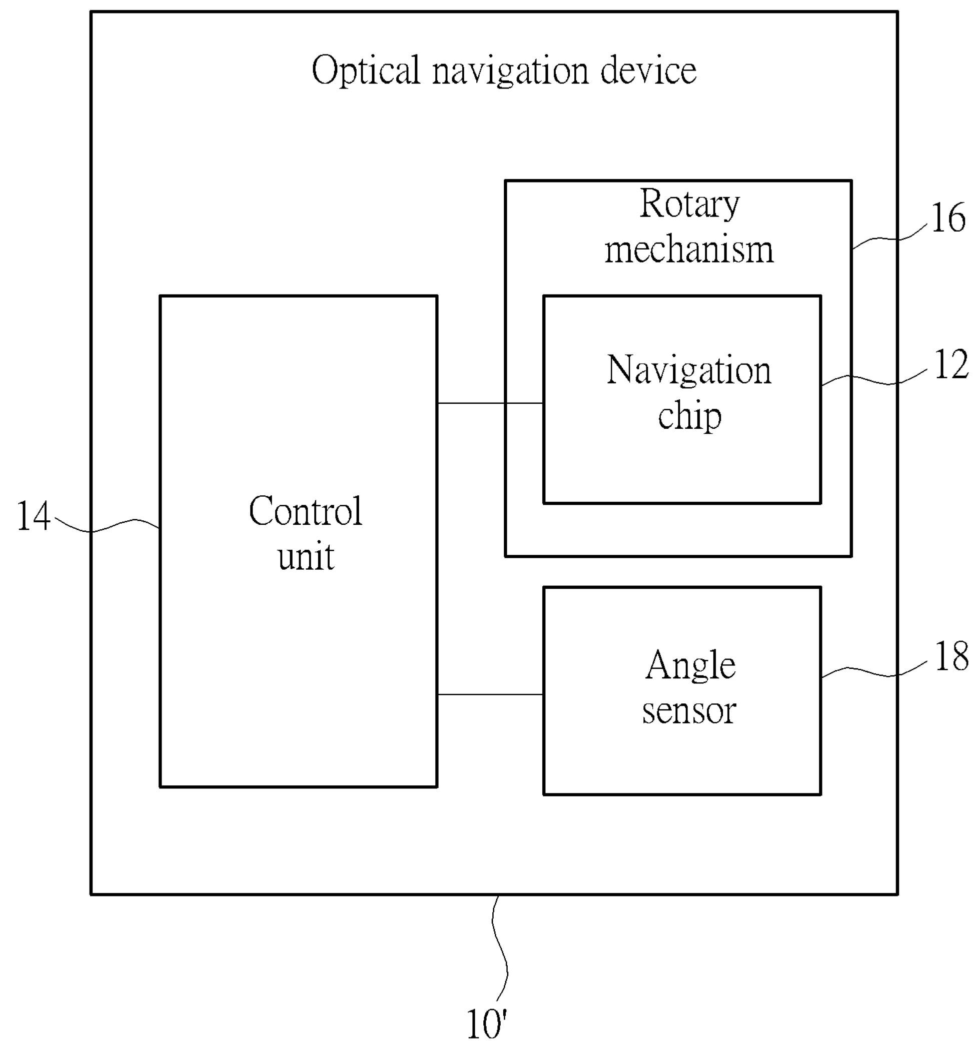
FIG. 5 is a functional block diagram of the optical navigation device according to another embodiment of the present invention.
Figure 6:
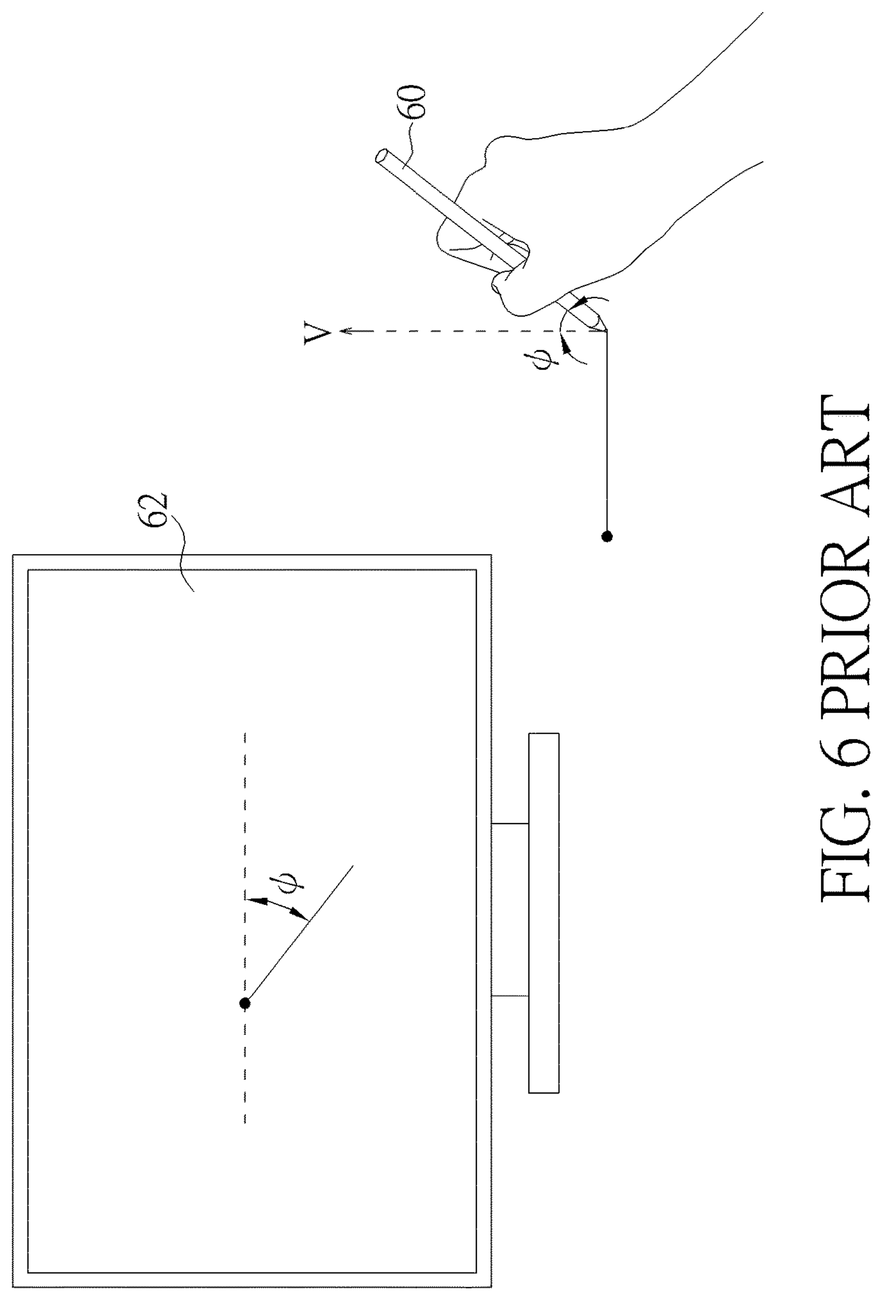
FIG. 6 is an operation diagram of an optical pen mouse in the prior art.

The above-mentioned embodiment utilizes software calculation to transform the first trace line t1 into the second trace line t2 by the calibration weight θu, in the meantime, orientation of the navigation chip 12 is oblique than the reference plane. The present invention further provides hardware calibration technique for the optical navigation device. Please refer to FIG. 5. FIG. 5 is a functional block diagram of the optical navigation device 10' according to another embodiment of the present invention. The optical navigation device 10' further includes a rotary mechanism 16 and/or an angle sensor 18. The rotary mechanism 16 is electrically connected to the control unit 14 and adapted to hold the navigation chip 12, and the angle sensor 18 is electrically connected to the control unit 14 and selectively assembled with the navigation chip 12. In this embodiment, while the control unit 14 acquires the calibration weight θu, the optical navigation device 10' rotates the navigation chip 12 to a corresponding angle (which means the calibration weight θu) via the rotary mechanism 16; though the pen tube of the pen mouse is inclined, the navigation chip 12 inside the pen mouse have been calibrated to the correct angle, and the trace line generated by the calibrated navigation chip 12 can be regarded as the real/final navigation trace of the optical navigation device 10'.

In addition, the optical navigation device 10' may not execute automatic calibration applied to the first trace line t1 and/or the inclined angle of the navigation chip 12. The optical navigation device of the present invention can output a prompting message which contains detection and calculation result of the calibration weight θu to remind the user, and the user arbitrarily decides whether to adjust the inclined angle and rotary range of the navigation chip 12 by the rotary mechanism 16.

The angle sensor 18 is applied to detect the self-rotary angle of the pen tube of the optical navigation device 10', such like the inclination of the pen tube while the pen mouse is handled in operation. Placement and angle of the user's hand may be varied in operation of the optical navigation device 10'; for example, while the pen mouse is utilized to write a row of characters, the self-rotary angle of the pen mouse in writing a head of the row of characters is different from the self-rotary angle of the pen mouse in writing a rear of the row of characters, therefore the control unit 14 may dynamically adjust the calibration weight θu by a linear trace prediction theory according to variation estimation of the self-rotary angle, to ensure that the user has neat writing by the optical navigation device 10'.

In conclusion, the navigation trace calibrating method and the related optical navigation device of the present invention can calculate the proper calibration weight of the navigation trace according to a body size and a posture of the user, handwriting posture (applied to the optical navigation device) is no need of adjustment, and the optical navigation device can accordingly calibrate the navigation trace drew by the user with different habit. The user executes the navigation trace calibrating method in first use of the optical navigation device, to acquire the personal value of the calibration weight, and the personal value can be stored in a memory unit of the optical navigation device for next application; or the optical navigation device may immediately acquire the current value of the calibration weight while the optical navigation device is operated, which depends on user's demand. After the calibration weight is calculated by the navigation trace calibrating method, the optical navigation device can automatically execute the navigation trace calibration, or adjust the navigation trace according to the calibration angle chosen by the user, or execute the navigation trace calibration according to presetting application program of the optical navigation device. Comparing to the prior art, the optical navigation device of the present invention has an advantage of adaptive calibrating function applied to the navigation trace for providing preferred market competition.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A navigation trace calibrating method of transforming a first trace line generated by an optical navigation device into a second trace line suitable for user operation, the navigation trace calibrating method comprising:
- establishing a reference coordinate system;
- reading and analyzing the first trace line;
- calculating a first offset of the first trace line relative to the reference coordinate system;
- defining an offset between the first trace line and the second trace line as calibration weight to acquire a second offset of the second trace line relative to the reference coordinate system; and
- calculating a value of the calibration weight according to the second offset and a length of the first trace line.

2. The navigation trace calibrating method of claim 1, further comprising:
- transforming the first trace line into the second trace line by the calibration weight; and
- defining the second trace line as a navigation trace of the optical navigation device.

3. The navigation trace calibrating method of claim 1, wherein the optical navigation device utilizes a navigation chip to generate the first trace line, the navigation trace calibrating method further comprises:
- rotating the navigation chip according to the calibration weight; and
- setting a trace line generated by the rotated navigation chip as a navigation trace of the optical navigation device.

4. The navigation trace calibrating method of claim 1, further comprising:
- utilizing an angle sensor to detect a self-rotary angle of the optical navigation device; and
- adjusting the calibration weight dynamically according to variation of the self-rotary angle.

5. The navigation trace calibrating method of claim 4, wherein a step of adjusting the calibration weight dynamically according to the variation of the self-rotary angle is executed by utilizing a linear trace prediction theory to adjust the calibration weight.

6. The navigation trace calibrating method of claim 1, wherein a step of reading and analyzing the first trace line is executed by establishing a calibration circle on the reference coordinate system, and a radius of the calibration circle is equal to the first trace line.

7. The navigation trace calibrating method of claim 1, wherein a step of calculating the first offset of the first trace line relative to the reference coordinate system is executed by acquiring a projection length of the first trace line upon the reference coordinate system, and then calculating the first offset by the projection length and the length of the first trace line.

8. The navigation trace calibrating method of claim 1, wherein a step of calculating the value of the calibration weight according to the second offset and the length of the first trace line comprises:

defining a projection length of the second trace line upon the reference coordinate system by the second offset; and utilizing the foresaid projection lengths, the lengths of the first trace line and the second trace line, and triangle side length formula to calculate the value of the calibration weight.

9. The navigation trace calibrating method of claim 1, wherein difference between the first offset and the calibration weight is equal to the second offset.

10. An optical navigation device with navigation trace calibrating function, capable of transforming a first trace line generated by the optical navigation device into a second trace line suitable for user operation, the optical navigation device comprising:

a navigation chip adapted to generate the first trace line; and a control unit electrically connected to the navigation chip and adapted to acquire information of the first trace line, the control unit utilizing the navigation chip to establish a reference coordinate system, analyzing the first trace line and calculating a first offset of the first trace line relative to the reference coordinate system, defining calibration weight between the first trace line and the second trace line to acquire a second offset of the second trace line relative to the reference coordinate system, and calculating a value of the calibration weight according to the second offset and a length of the first trace line.

11. The optical navigation device of claim 10, wherein the control unit is integrated with the navigation chip, or is a control chip independent of the navigation chip, or is an operating processor of a computer system independent of the navigation chip.

12. The optical navigation device of claim 10, wherein the control unit transforms the first trace line into the second trace line by the calibration weight, and the second trace line is defined as a navigation trace of the optical navigation device.

13. The optical navigation device of claim 10, further comprising:

a rotary mechanism electrically connected to the control unit and adapted to hold the navigation chip, the control unit utilizing the rotary mechanism to rotate the navigation chip via the calibration weight, and setting a trace line generated by the rotated navigation chip as a navigation trace of the optical navigation device.

14. The optical navigation device of claim 13, further comprising:

an angle sensor electrically connected to the control unit, the control unit utilizing the angle sensor to detect a self-rotary angle of the optical navigation device, and dynamically adjusting the calibration weight by the rotary mechanism according to variation of the self-rotary angle.

15. The optical navigation device of claim 14, wherein the control unit utilizes a linear trace prediction theory to adjust the calibration weight.

16. The optical navigation device of claim 10, wherein the control unit analyzes the first trace line to establish a calibration circle on the reference coordinate system, and a radius of the calibration circle is equal to the first trace line.

17. The optical navigation device of claim 10, wherein the control unit acquires a projection length of the first trace line upon the reference coordinate system, and then calculates the first offset by the projection length and the length of the first trace line.

18. The optical navigation device of claim 10, wherein the control unit defines a projection length of the second trace line upon the reference coordinate system by the second offset, and utilizes the foresaid projection lengths, the lengths of the first trace line and the second trace line, and triangle side length formula to calculate the value of the calibration weight.

19. The optical navigation device of claim 10, wherein difference between the first offset and the calibration weight is equal to the second offset.

* * * * *